United States Patent
Chin

(10) Patent No.: US 10,423,629 B2
(45) Date of Patent: Sep. 24, 2019

(54) INTELLIGENT TABULAR BIG DATA PRESENTATION IN SEARCH ENVIRONMENT BASED ON PRIOR HUMAN INPUT CONFIGURATION

(71) Applicant: MICROSOFT TECHNOLOGY LICENSING, LLC, Redmond, WA (US)

(72) Inventor: Chun Ming Chin, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 839 days.

(21) Appl. No.: 15/064,997

(22) Filed: Mar. 9, 2016

(65) Prior Publication Data
US 2017/0083526 A1 Mar. 23, 2017

Related U.S. Application Data

(60) Provisional application No. 62/222,124, filed on Sep. 22, 2015.

(51) Int. Cl.
*G06F 16/00* (2019.01)
*G06F 16/2457* (2019.01)
(Continued)

(52) U.S. Cl.
CPC .... *G06F 16/24578* (2019.01); *G06F 16/2282* (2019.01); *G06F 16/248* (2019.01);
(Continued)

(58) Field of Classification Search
CPC .............. G06F 16/248; G06F 16/9535; G06F 16/2282; G06F 16/2457; G06F 16/24575;
(Continued)

(56) References Cited

U.S. PATENT DOCUMENTS 6,286,005 B1 9/2001 Cannon
7,725,464 B2 5/2010 Grubb et al.
(Continued)

FOREIGN PATENT DOCUMENTS

WO 2007051067 A2 5/2007

OTHER PUBLICATIONS

Manage ads and feeds in "Business Data", Published on: Apr. 6, 2015 Available at: https://support.google.com/adwords/answer/6072708?hl=en.

(Continued)

*Primary Examiner* — Merilyn P Nguyen
(74) *Attorney, Agent, or Firm* — Michael Best & Friedrich LLP

(57) ABSTRACT

An intelligent tabular big data presentation in search environment based on prior human input configuration is provided. In some examples, a server may execute a search service that may receive a request from a party associated with the data to modify a presentation of a subset of the data and may present configuration options to the requesting party. The configuration options may include a selection of the subset of the data and parameters associated with the presentation of the subset of the data. The selected subset of the data may be formatted based on the received selection of the configuration options. A search query associated with the data may be received and may be executed on the subset of the data. A preview table may be generated and provided based on two dimensionally ranked search results of the subset of the data in accordance with the selection of the parameters.

20 Claims, 8 Drawing Sheets

(51) Int. Cl.
*G06Q 10/10* (2012.01)
*G06F 16/951* (2019.01)
*G06F 16/22* (2019.01)
*G06F 16/33* (2019.01)
*G06F 16/248* (2019.01)

(52) U.S. Cl.
CPC .... *G06F 16/2457* (2019.01); *G06F 16/24575* (2019.01); *G06F 16/3349* (2019.01); *G06F 16/951* (2019.01); *G06Q 10/105* (2013.01)

(58) Field of Classification Search
CPC .......... G06F 16/24578; G06F 16/3349; G06F 17/211; G06F 17/245; G06F 17/246; G06F 16/686; G06F 16/168; G06F 16/9032; G06F 16/90335; G06F 16/951; G06F 3/0481; G06F 3/0484
See application file for complete search history.

(56) References Cited

U.S. PATENT DOCUMENTS

| | | | |
|---|---|---|---|
| 7,747,676 | B1 | 6/2010 | Nayfeh et al. |
| 8,176,440 | B2* | 5/2012 | Stading ............... G06F 16/9038 715/853 |
| 8,370,464 | B1 | 2/2013 | Chitilian et al. |
| 8,396,742 | B1 | 3/2013 | Blume et al. |
| 8,473,346 | B2 | 6/2013 | Mattern et al. |
| 10,185,708 | B2* | 1/2019 | Miller ...................... G06F 16/00 |
| 10,185,740 | B2* | 1/2019 | Lamas ................ G06F 16/2428 |
| 2002/0128908 | A1 | 9/2002 | Levin et al. |
| 2004/0044571 | A1 | 3/2004 | Bronnimann et al. |
| 2005/0149396 | A1 | 7/2005 | Horowitz et al. |
| 2007/0174118 | A1 | 7/2007 | Dekel et al. |
| 2008/0092033 | A1* | 4/2008 | Palleschi ............... G06F 17/247 715/227 |
| 2009/0031230 | A1* | 1/2009 | Kesler .................. G06F 16/252 715/764 |
| 2010/0198823 | A1* | 8/2010 | Tsoukalas ............. G06F 17/241 707/736 |
| 2010/0211564 | A1* | 8/2010 | Cohen .................. G06F 16/951 707/722 |
| 2011/0276588 | A1 | 11/2011 | Moon et al. |
| 2012/0096030 | A1 | 4/2012 | Kim |
| 2012/0226687 | A1 | 9/2012 | Xu et al. |
| 2013/0205223 | A1* | 8/2013 | Gilbert ............... G06Q 30/0269 715/748 |
| 2014/0180762 | A1* | 6/2014 | Gilbert .................. G06F 16/686 705/7.29 |
| 2016/0019316 | A1* | 1/2016 | Murphey ............ G06F 16/9032 707/722 |
| 2016/0357874 | A1* | 12/2016 | Keel ...................... G06Q 10/10 |

OTHER PUBLICATIONS

Slawski, Bill, "Search Engines Extracting Table Data on the Web", Published on: Aug. 21, 2008 Available at: http://www.seobythesea.com/2008/08/search-engines-extracting-table-data-on-the-web/.

Evko, Tim, "5 Innovative Ways to Use Web Data", Published on: Oct. 1, 2014 Available at: http://www.sitepoint.com/5-innovative-ways-use-web-data/.

Dong, Yingsai, "KeywordVis: Identifying and Analyzing Keywords for Search Engine Advertising", Retrieved on: Sep. 18, 2015 Available at: http://www-devel.cs.ubc.ca/~tmm/courses/547-14/projects/yingsai/report.pdf.

"Revionics", Published on: Jul. 3, 2014 Available at: http://www.revionics.com/advertising.html.

Shin, et al., "Using Urls and table layout for web classification tasks", In Proceedings of the 13th international conference on World Wide Web, May 17, 2004, pp. 193-202.

"Second Written Opinion Issued in PCT Application No. PCT/US2016/051799", dated Apr. 18, 2017, 10 pages.

"International Preliminary Report on Patentability Issued in PCT Application No. PCT/US2016/051799", dated Aug. 8, 2017, 11 Pages.

"International Search Report and Written Opinion Issued in PCT Application No. PCT/US2016/051799", dated Nov. 22, 2016, 14 Pages.

Sheth, et al. "Federated Database Systems for Managing Distributed, Heterogeneous, and Autonomous Databases", In the Proceedings of ACM in Computing Surveys, vol. 22, Issue 3, Sep. 2, 1990, pp. 183-236.

* cited by examiner

| PREVIEW TABLE 402 | | | | | |
|---|---|---|---|---|---|
| EMPLOYEE NU. 404 | CONTACT NAME 406 | JOB TITLE 408 | COMPANY NAME 410 | EMAIL ADD. 412 | TELE. NU. 414 |
| CONFIDENTIAL | JOHN DOE | SALES EXECUTIVE | CONTOSO | CONFIDENTIAL | CONFIDENTIAL |
| CONFIDENTIAL | JANE DOE | OPERATIONS MGR. | CONTOSO | CONFIDENTIAL | CONFIDENTIAL |
| CONFIDENTIAL | SARAH SMITH | PUBLIC REL. MGR. | CONTOSO | CONFIDENTIAL | CONFIDENTIAL |
| CONFIDENTIAL | JILL SMITH | RES. ASSISTANT | CONTOSO | CONFIDENTIAL | CONFIDENTIAL |
| CONFIDENTIAL | CHRIS DOE | OFFICE ASSISTANT | CONTOSO | CONFIDENTIAL | CONFIDENTIAL |

FIG. 4

INTELLIGENT TABULAR BIG DATA PRESENTATION IN SEARCH ENVIRONMENT BASED ON PRIOR HUMAN INPUT CONFIGURATION

CROSS-REFERENCE TO RELATED APPLICATION

This Application claims priority under 35 U.S.C. § 119(e) to U.S. Provisional Patent Application Ser. No. 62/222,124 filed on Sep. 22, 2015. The disclosure of the U.S. Provisional Patent Application is hereby incorporated by reference in its entirety.

BACKGROUND

Networked computing devices allow individual users, businesses, government entities, and other organizations to collect, share, and review a wide spectrum of data. With the increasing popularity of networked computing; capabilities in all aspects of personal and professional lives, very large amounts of data, or big data, may accumulate. Reviewing big data, typically through search services, becomes a challenge.

The mining of big data is cost prohibitive and time consuming, as big data is vast and may include information that is both structured and unstructured. Additionally, users typically want to see a focused subset of information about a searched item. However, given the abundance of data closely or remotely related to almost every search term, search services may not be able to provide the focused information to the user. Moreover, data owners may want their data to be presented to the user in a controlled manner.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing intelligent tabular big data presentation in search environment based on prior human input configuration. In examples, a server may execute a search service that may receive a request from a party associated with the data to modify a presentation of a subset of the data and may present configuration options to the requesting party. The configuration options may include a selection of the subset of the data and parameters associated with the presentation of the subset of the data. The selected subset of the data may be formatted based on the received selection of the configuration options. A search query associated with the data may be received and may be executed on the subset of the data. A preview table may be generated and provided based on two-dimensionally ranked search results of the subset of the data in accordance with the selection of the parameters.

These and other features and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 4 is a display diagram illustrating a preview table generated based on two dimensionally ranked search results of a subset of the data in accordance with a selection of parameters, according to embodiments;

DETAILED DESCRIPTION

Figure 1:
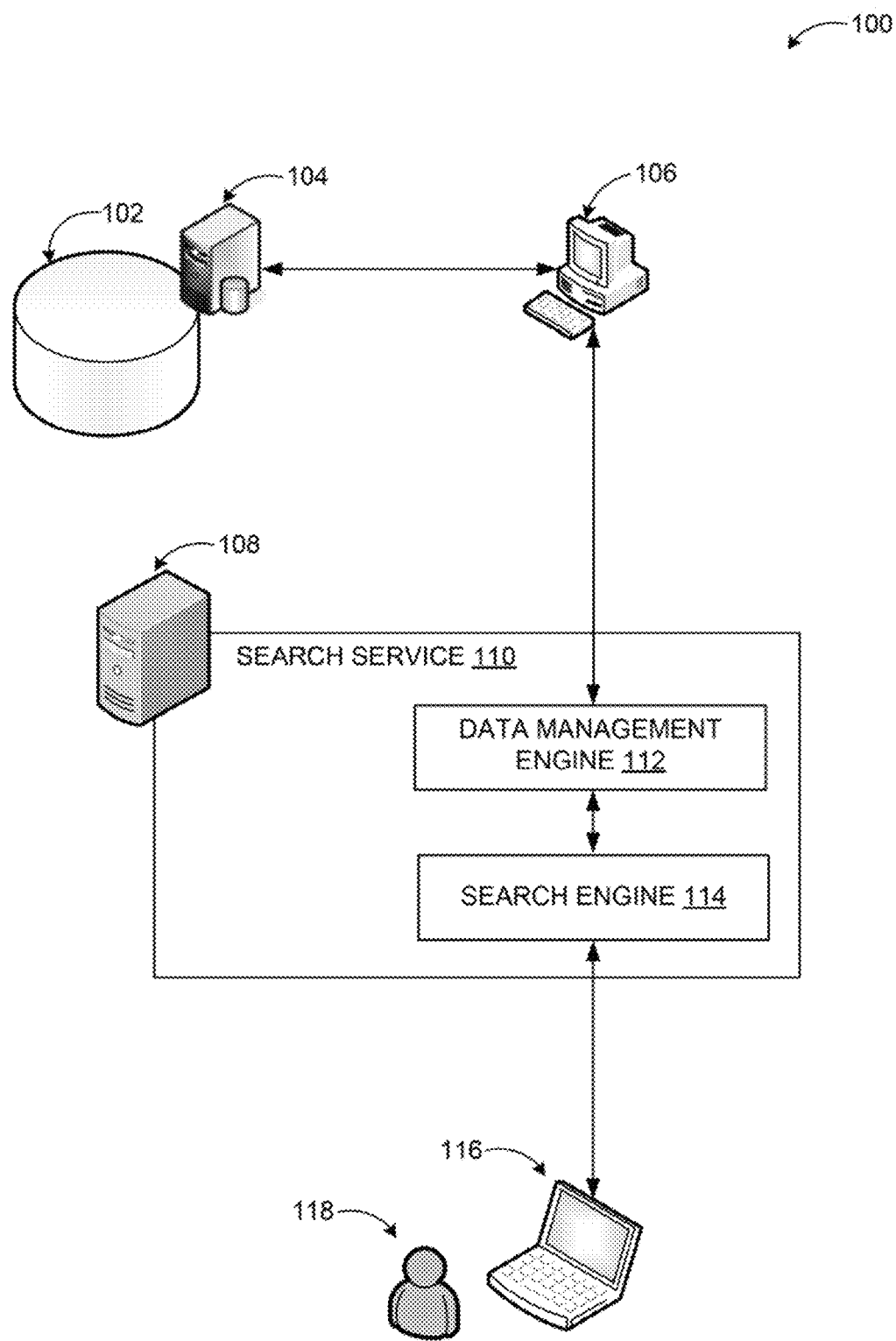
FIG. 1 is a conceptual diagram illustrating an example computing environment for providing a tabular presentation of data in a search environment, according to embodiments.

As briefly described above, embodiments are directed to providing a tabular presentation of data in a search environment. In examples, a server may execute a search service that may receive a request from a party associated with the data to modify a presentation of a subset of the data and may present configuration options to the requesting party. The configuration options may include a selection of the subset of the data and parameters associated with the presentation of the subset of the data. The selected subset of the data may be formatted based on the received selection of the configuration options. A search query associated with the data may be received and may be executed on the subset of the data. A preview table may be generated and provided based on two-dimensionally ranked search results of the subset of the data in accordance with the selection of the parameters.

In some examples, the search service may be further configured to receive another selection of the configuration options. The other selection of the configuration options May include another selection of the parameters associated with the presentation of the subset of the data. The other selection of the parameters associated with the presentation of the subset of the data may include a link to a professional networking site and a link to a social networking site. The search service may re-format the selected subset of the data based on the received selection of the configuration options. Then, search service may also receive another search query associated with the data and may execute the other search query on the subset of the data. Next, the search service may modify the preview table based on two-dimensionally ranked search results of the subset of the data in accordance with the other selection of the parameters and may provide the modified preview table in response to the search query. The search service may then receive an action executed on one of the search results on the modified preview table. The action may include an input action or a hover action. Then, the search service may execute one of the action to open the link to the professional networking site or execute the action to open the link to the social networking site.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing a tabular presentation of data in a search environment. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in connection with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

While example implementations are described using search data herein, embodiments are not limited to search data. Providing a tabular presentation of data in a search environment may be implemented in other environments, such as big data, research data, data sharing, application sharing, online conferencing, and similar communications, where search data may be exchanged.

The technical advantages of providing a tabular presentation of data in a search environment may include, among others, increased security and efficiency in data presentation. Additionally, processing and network bandwidth usage may be reduced by using pre-formatted presentation of subsets of big data. Participant interaction with big data may be improved by allowing the participants to receive focused and ranked search results in a friendly format. Additionally, displaying the search results in a tabular presentation may allow an enhanced participant interaction with the search results when compared to interactions associated with conventional search results, as conventional search results may merely include a list of URLs and snippets of content from the title and/or body of found webpages.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with communications.

FIG. 1 is a conceptual diagram illustrating an example computing environment for providing a tabular presentation of data in a search environment, according to embodiments.

As shown in a diagram 100, a server 108 may execute a search service 110. The server 108 may include a web server or a document server, among others. The search service 110 may include a data management engine 112 and a search engine 114.

The data management engine 112 may receive a request from a pay (e.g., a requesting, party 106) associated with data to modify a presentation of a subset of the data. In some examples, the data may include big data. Big data may be broadly defined as data sets with sizes beyond the ability of commonly used software tools to capture, curate, and process within a reasonable amount of time.

The requesting party 106 may include a data owner or a third party, among other examples. The data may be stored in a data store 102 managed by a data management server 104. The data management engine 112 may present configuration options on a user experience to the requesting party 106. The user experience may be a visual display associated with the search service 110 through which the requesting party 106 may interact with the search service 110. The interactions may include a touch input, a gesture input, a voice command, eye tracking, a gyroscopic input, a pen input, mouse input, and/or a keyboards input, among others. The configuration options may include a selection of the subset of the data and/or a selection of parameters associated with the presentation of the subset of the data, among other options. In response to receiving a selection of the configuration options from the requesting party 106, the search service 110 may format the selected subset of the data based on the received selection of the configuration options.

The search engine 114 of the search service 110 may be configured to receive a search query associated with the data from a client application executed on a computing device 116. The computing, device 116 may communicate with the server 108 through a network. The network may provide wired or wireless communications between nodes, such as the computing device 116 or the server 108.

The computing device 116 may include a display device, such as a touch enabled display component, and a monitor, among others, to provide the client application to a participant 118. The computing device 116 may include a desktop computer, a laptop computer, a tablet, a handheld device, a vehicle mount computer, an embedded computer system, a smart phone, and a wearable computer, among other similar computing devices, for example. Local access to the client application may be provided by locally installed rich clients (e.g., a local version of the client application) or generic applications, such as a browser on the computing device 116.

The search engine 114 may then execute the search query on the subset of the data. The search engine 114 may then generate and provide a preview table. The preview table may include two-dimensionally ranked search results of the subset of the data in accordance with the selection of the parameters. The search results may be provided in a tabular format, a graphical format, or in a chart, among other examples. The two-dimensionally ranked search results may include query rows and query columns of the search results, presenting the subset of the data in a more participant-friendly and manageable format.

In some examples, additional aspects of the search results may be presented, such as static metadata or dynamic metadata associated with the presented subset of data, among other aspects. The preview table may be applied in scenarios such as, performing searches of personnel associated with a company, searches of geographic entities (e.g., banks, schools, shops, etc.), advertising searches, searches of computational research data, searches of historical data trends (e.g., financial, climatic, population, etc.), and various others.

While the example system in FIG. 1 has been described with specific components including the data store 102, the data management server 104, the server 108, the search service 110, the computing device 116, embodiments are not limited to these components or system configurations and can be implemented with other system configuration employing fewer or additional components.

Figure 2:
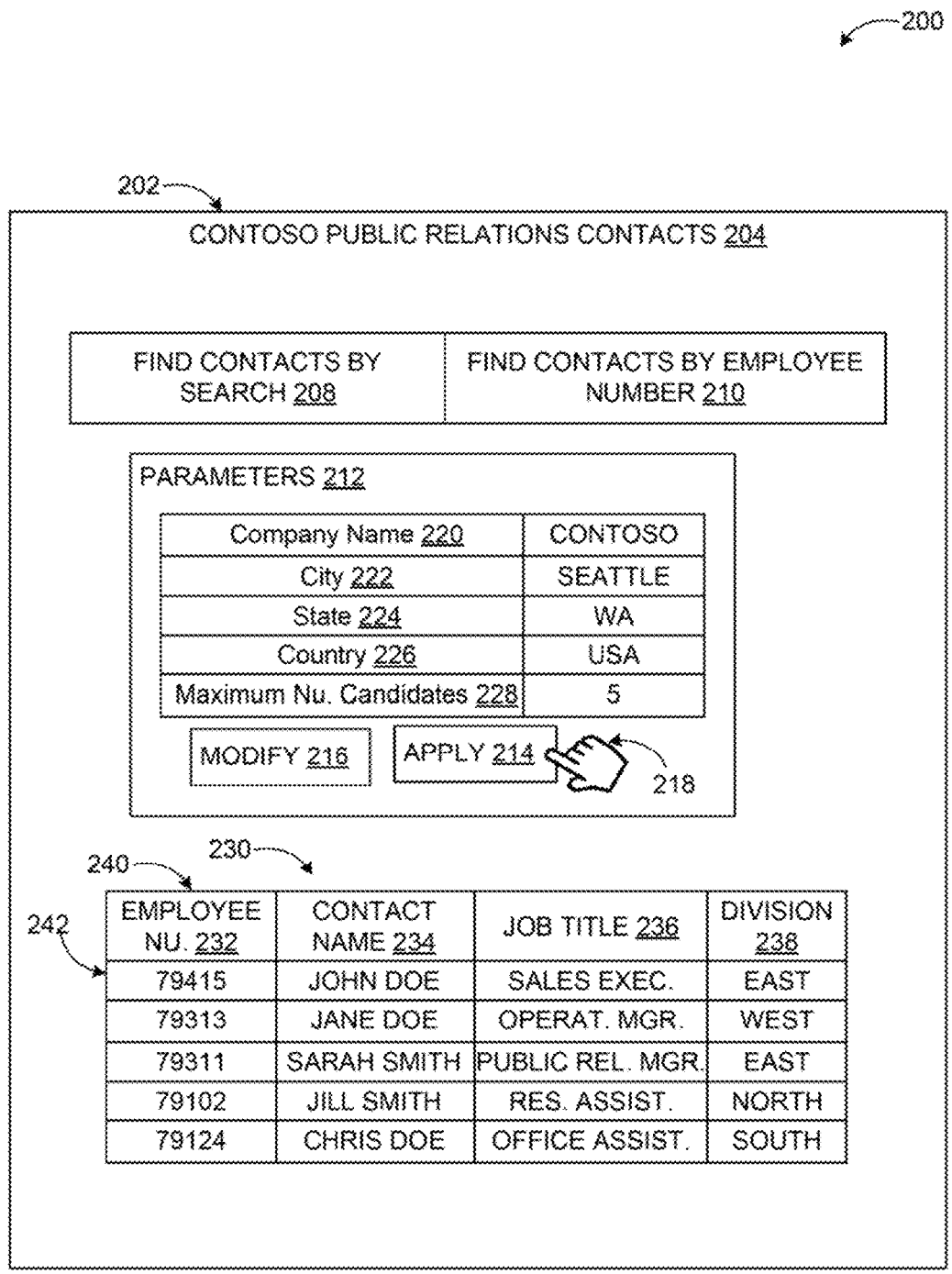
FIG. 2 is a display diagram illustrating example parameters applied by a requesting party to data, according to embodiments.

FIG. 2 is a display diagram illustrating example parameters applied by a requesting party to data, according to embodiments.

In a diagram 200, a server may include a search service. In some examples, the search service may be accessed by a requesting party (e.g., a data owner or a third party) associated with data (e.g., Contoso public relations contacts 204). The data may include big data. The data may be stored in a data store managed by a data management server. The mining of the data may become cost prohibitive and time consuming, as big data is vast (e.g., may include millions of rows and columns) and may be both structured and unstructured data.

The search service may receive a request from the requesting party (e.g., a third party data marketplace in the illustrated example) to modify a presentation of a subset of the data (e.g., the Contoso public relations contacts 204). The search service may also present configuration options on a user experience 202 to the requesting party. The configuration options may include a selection of the subset of the data the Contoso public relations contacts 204), which may be based on a name of an employee at Contoso 208 or may be based on an employee identification at Contoso 210, among others.

The configuration options may also include a selection of parameters 212 associated with the presentation of the subset of the data, among, other selections. The parameters 212 associated with the presentation of the subset of the data may include a maximum number of returned search results 228 (e.g., one hundred returned search results), a minimum number of the returned search results (e.g., ten returned search results), a name of a company 220 associated with the data (e.g., Contoso), personnel associated with the company (e.g., a list of employees associated with Contoso), a location of the company (e.g., a city of the company 222, a state of the company 224, and/or a country of the company 226, among others), an identification associated with the employee of the company (e.g., an employee badge number), a job title associated with the employee (e.g., a sales executive title, an operations manager title, or a research assistant title, etc.), a telephone number associated with the employee, an email address associated with the employee, a link to a professional networking site, a link to a social networking site, and/or metadata (e.g., static or live metadata), among others.

For example, the search service may determine that the requesting party selected several of the parameters 212, such as the name of the company 220 associated with the data (e.g., Contoso), the city of the company 222 (e.g., Seattle), the state of the company 224 (e.g., Washington), the country of the company 226 (e.g., United States of America), and the maximum number of returned search results 228 (e.g., five). In response to receiving a selection of the configuration options, the search service may format the selected subset of the data based on the received selection of the configuration options. In some examples, the search service may then receive an input action 218 executed on an apply icon 214 on the user experience 202 to apply the selected parameters to the subset of the data. In other examples, the search service may then receive the input action 218 executed on a modify icon 216 on the user experience 202 to allow the requesting party to further modify the parameters applied to the subset of the data.

In some examples, the search service may detect a credential associated with the requesting party from the data and may compare the credential to a predefined rule. In response to detecting a match between the credential and the predefined rule, the search service may identify the requesting party as an administrator and may contact the requesting party to prompt the requesting party to modify the configuration options on the user experience. The search service may receive a selection of the configuration options from the requesting party and may re-format the selected subset of the data based on the received selection of the configuration options. In other examples, if the search service fails to detect the match between the credential and the predefined rule, the search service may fail to identify the requesting party as the administrator and may disallow the requesting party to modify the configuration options on the user experience.

After an application of the parameters to the subset of the data, the search service may return search results 230. In the illustrated example in the diagram 200, the search results 230 may include the an identification associated with the employee 232, the employee name 234, the job title of the employee 236, and a division the employee works fir 238. In some examples, the search results 230 may be displayed in a preview table in two-dimensional rows 242 and columns 240, among other configurations. The search results 230, however, may include a long list of relevant or irrelevant information associated with the data, despite the application of the parameters. As such, the requesting party may have to spend a substantial amount of time sifting through the search results 230 to determine what information is relevant and irrelevant.

In another example, the search service may receive a request from the requesting party (e.g., a third party researcher) to modify a presentation of the subset of the data. The search service may present configuration options on the user experience 202 to the requesting party. The researcher may wish to search for collaborators in the field of organic chemistry at a particular research organization (e.g., a public university, a government research institute, etc.) and may search for terms related to organic chemistry. The researcher may select the parameters 212, "contact" or "researcher". In response, the search service may return the search results 230 that may include a list of relevant and irrelevant information associated with the researchers in organic chemistry, in other areas (e.g., chemistry, biochemistry, bioengineering, physical chemistry, etc.), in other institutions, repeated information (e.g., same researcher may be listed repeatedly for each of their publications), etc. The returned search results may include a list of URLs and snippets of content from the title and/or body of found webpages. Thus, the researcher may have to spend substantial time and energy to filter through the results and extract the specific information they are seeking.

Figure 3:
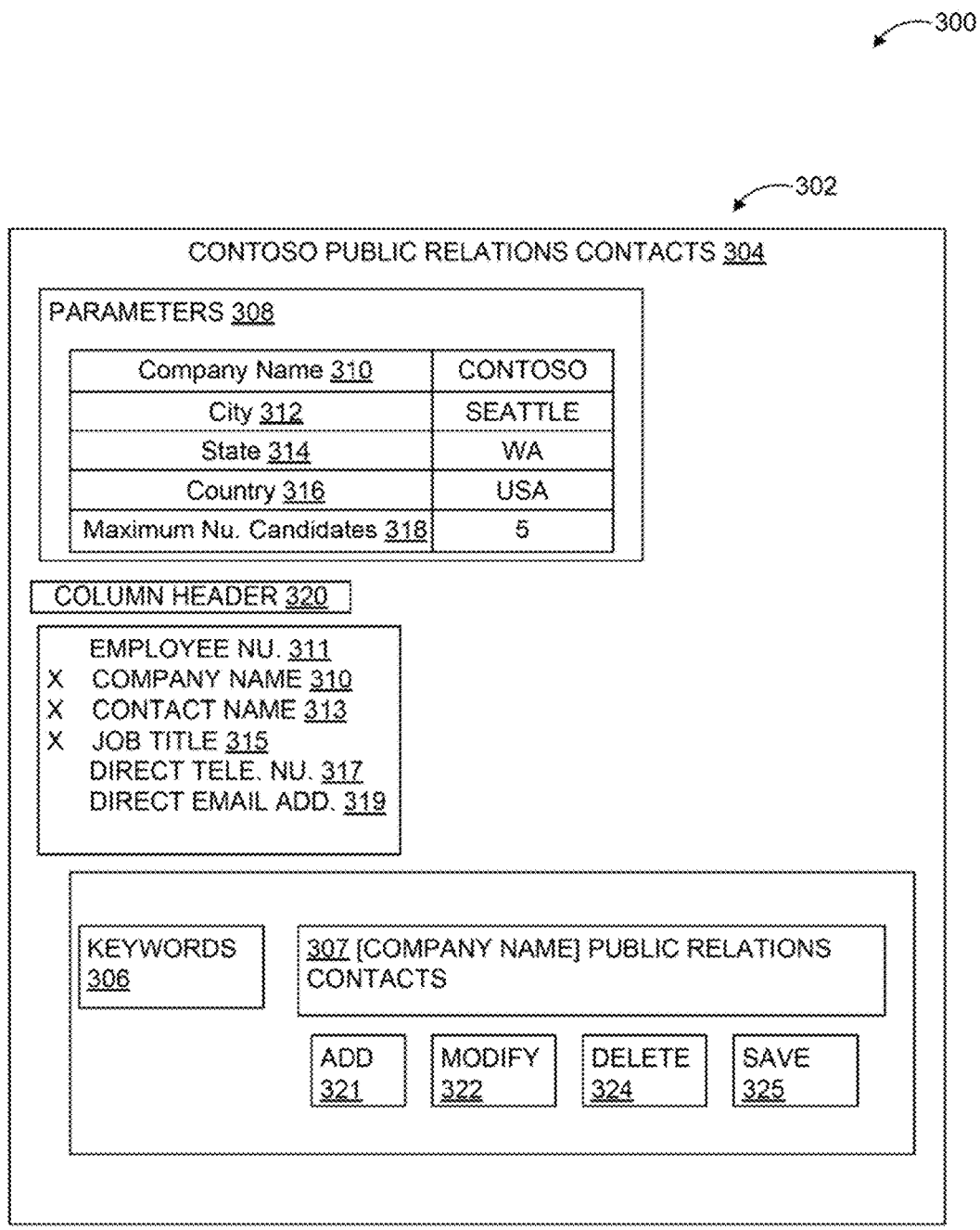
FIG. 3 is a display diagram illustrating example configuration options applied by a requesting party to data to format a selected subset of the data, according to embodiments.

FIG. 3 is a display diagram illustrating example configuration options applied by a requesting party to data to format a selected subset of the data, according to embodiments.

In a diagram 300, data Contoso public relations contacts 304) may be stored in a data store managed by a data management server. A server may include a search service. The search service may receive a request from a party associated with the data to modify a presentation of a subset of the data. In response, the search service may present configuration options on a user experience 302 to the requesting party.

The configuration options may include a selection of the subset of the data and/or a selection of parameters 308 associated with the presentation of the subset of the data, among others. The parameters 308 associated with the presentation of the subset of the data may include a name of a company 310 associated with the data, personnel associated with the company, a location of the company (e.g., a city 312 of the company, a state 314 of the company, a country 316 of the company), and a maximum number 318 of returned search results. In an example, the requesting party may select the parameters 308 associated with the name of the company 310 (e.g., Contoso), the city 312 of the company (e.g., Seattle), the state 314 of the company (e.g., Washington), the country 316 of the company (e.g., United States of America), and the maximum number 318 of returned search results (e.g., five).

In response to receiving a selection of the configuration options, the search service may format the selected subset of the data. The search service may also receive a search query associated with the data and may execute the search query on the subset of the data, in response to the execution of the search query on the subset of the data, the search service may generate and provide a preview table based on two-dimensionally ranked search results of the subset of the data in accordance with the selection of the parameters 308.

In an example, the search service may allow the requesting party to modify the search results displayed in the preview table. In some examples, the requesting patty may suggest a ranking of the search results displayed in the preview table. For example, the requesting party may weigh the company 310 name parameter greater than the country 316 parameter. As such, when the preview table is displayed, a search result that includes the company name Contoso will be ranked higher in the table than another search result that includes the country of the United States of America.

In another example, the requesting party may wish to only publically display the subset of the data having select parameters. The search service may receive a selection of the parameters 308 associated with the name of the company 310, a name of the employee 313, and a title of a job associated with the employee 315. The selected parameters may be mapped to column headers 320 in the preview table and may be presented in response to receipt of the search query. Since the requesting party did not select the employee number (e.g., the employee identification) 311, a direct telephone number of the employee 317, and a direct email address of the employee 319, when the preview table is generated and presented, these values will be protected from public view and will be listed as protected or confidential.

In another embodiment, the search service may allow the requesting party to add 321, modify 322, delete. 324, or save 325 keywords 306 associated with the search query executed on the data to trigger the search results. For example, the search service may allow the requesting party to input the keywords 306 into an entry field 307 on the user experience 302. In some examples, the search service may allow the requesting party to input a selected parameter (e.g., the company name Contoso) followed by a keyword 306 (e.g., public relations contacts). When the search service receives the search query containing the selected company name parameter "Contoso" that is associated with the keywords "public relations contacts," the company name parameter may be mapped to a column header of the preview table. Additionally, the search query may be executed on the subset of the data and preview table may be populated with the search results associated with the selected parameter 308.

FIG. 4 is a display diagram illustrating a preview table generated based on two dimensionally ranked search results of a subset of the data in accordance with a selection of parameters, according to embodiments.

In a diagram 400, a search service executed by a server may receive a selection of configuration options from a requesting party, which may include a selection of parameters. The selected parameters may include a name of an employee 406, a job title associated with the employee 408, and/or a company name associated with the employee 410, among, others. Unselected parameters may include an employee identification number 404, an email address associated with the employee 412, and/or a telephone number associated with the employee 414, among others.

In response to receiving a search query associated with the data and executing the search query on the subset of the data, the search service may generate a preview table 402 based on two-dimensionally ranked search results of the subset of the data in accordance with the selection of the parameters. The selected parameters may be mapped to column headers in the preview table 402 (e.g., the name of an employee 406, the job title associated with the employee 408, and the company name associated with the employee 410). Since the requesting party did not select the employee identification number 404, the email address associated with the employee 412, and the telephone number associated with the employee 414, these values will be protected from public view and will be listed as protected or confidential.

In some examples, the search service may analyze a context of a keyword (e.g., "sales") associated with the search query and may analyze a context of a keyword associated with the selected parameters (e.g., "the job title associated with the employee" 408). The search service may compare the context of the keyword (e.g., "sales") associated with the search query to the context of the keyword associated with the selected parameters (e.g., "the job title associated with the employee" 408). The search service may detect a first match percentage between the context of the keyword (e.g., "sales") associated with the search query and the context of the keyword associated with the parameters (e.g., "the job title associated with the employee" 408). The search service may rank rows in the preview table 402 in one of an ascending order and a descending order based on the first match percentage. As John Doe's job title is a sales execute, he may be ranked first or last depending on whether the rows of the preview table 402 are ranked in an ascending or a descending order.

In another example, the search service may detect a second match percentage between the context of the keyword (e.g., "office") associated with the search query and the context of the keyword associated with the one or more parameters e.g., "the job title associated with the employee" 408). In response the search service may rank rows in the preview table 402 in one of an ascending order and a descending order based on the second match percentage. The first match percentage may be greater than the second match percentage. In this example, Chris Doe's job title is an office assistant. As such, he may be ranked first or last in the preview table 402, depending on whether the rows of the preview table are ranked in an ascending or descending order.

In other examples, the search service may also implement an intelligent learning algorithm to identify a previous search query associated with the data. The previous search query may share a keyword, a syntax modifier, and/or a portion of the keyword with the search query. The search service may also execute the previous search query on the subset of the data. The search service may then modify the preview table based on two-dimensionally ranked previous search results of the subset of the data. The search service may further rank the search results of the subset of the data based on the ranking of the previous search results of the subset of the data and may model the preview table 402 based on the generation of the modified preview table.

Figure 5:
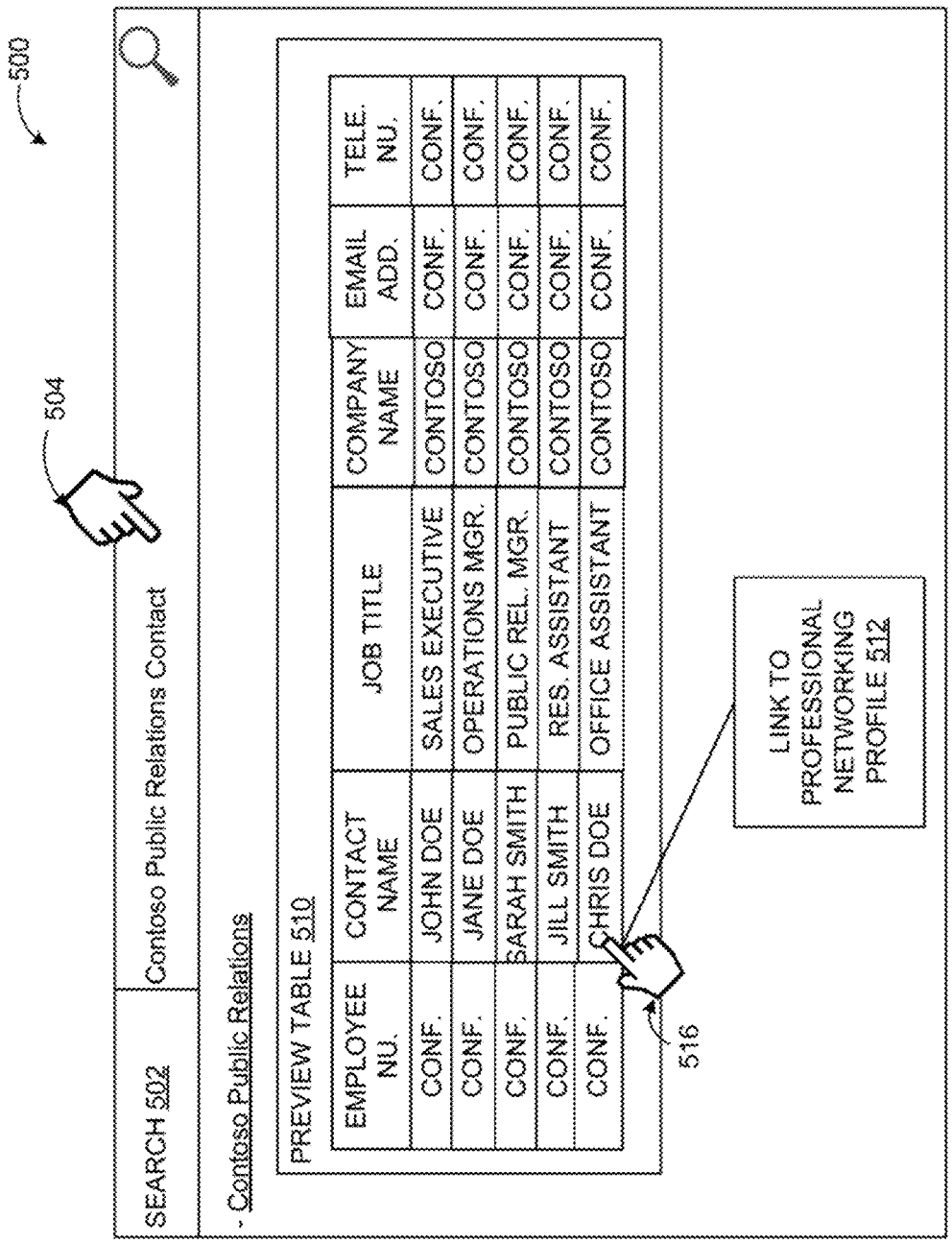
FIG. 5 is a display diagram illustrating an action executed on a displayed preview table to open a link associated with a search result, according to embodiments.

FIG. 5 is a display diagram illustrating an action executed on a displayed preview table to open a link associated, with a search result according to embodiments.

In a diagram 500, a server may execute a search service. The search service may receive a search query associated with the data. In some examples, the search service may receive the search query from a computing device associated with a participant. In an example, the participant may access the search service through locally installed or thin (e.g., browser) client applications executed on a computing device, such as a smart phone, a mobile computer, or a desktop computer, among others.

For example, the participant may input 504 the search query, "Contoso Public Relations Contact" into a search entry field 502 of the browser on a client application executed on the computing device. The search service may execute the search query on the subset of the data. In response the search service may generate and provide a preview table 510 based on two dimensionally ranked search results of the subset of the data in accordance with the selection of the parameters. In some examples, the search service may employ a textual scheme, a graphical scheme, an audio scheme, an animation scheme, a coloring scheme, a highlighting scheme, and/or a shading scheme to distinguish the search results of the subset of the data in the preview table.

In some examples, the search service may receive another selection of the configuration options. The other selection of the configuration options may include another selection of the parameters associated with the presentation of the subset of the data (e.g., a link to a professional networking site and/or a link to a social networking site, among others). In other examples, the search service may re-format the selected subset of the data based on the other selection of the configuration options.

In some examples, the search service may receive another search query associated with the data. In response, the search service may execute the other search query on the subset of the data and may modify the preview table based on two-dimensionally ranked search results of the subset of the data in accordance with the other selection of the parameters.

Then, the search service may receive an action 516 executed on one of the search results Chris Doe) on the modified preview table 510. The action may include an input action or a hover action, among others. Next, the search service may execute one of the action to open the link to the professional networking site 512 or may execute the action to open the link to the social networking site.

Figure 6:
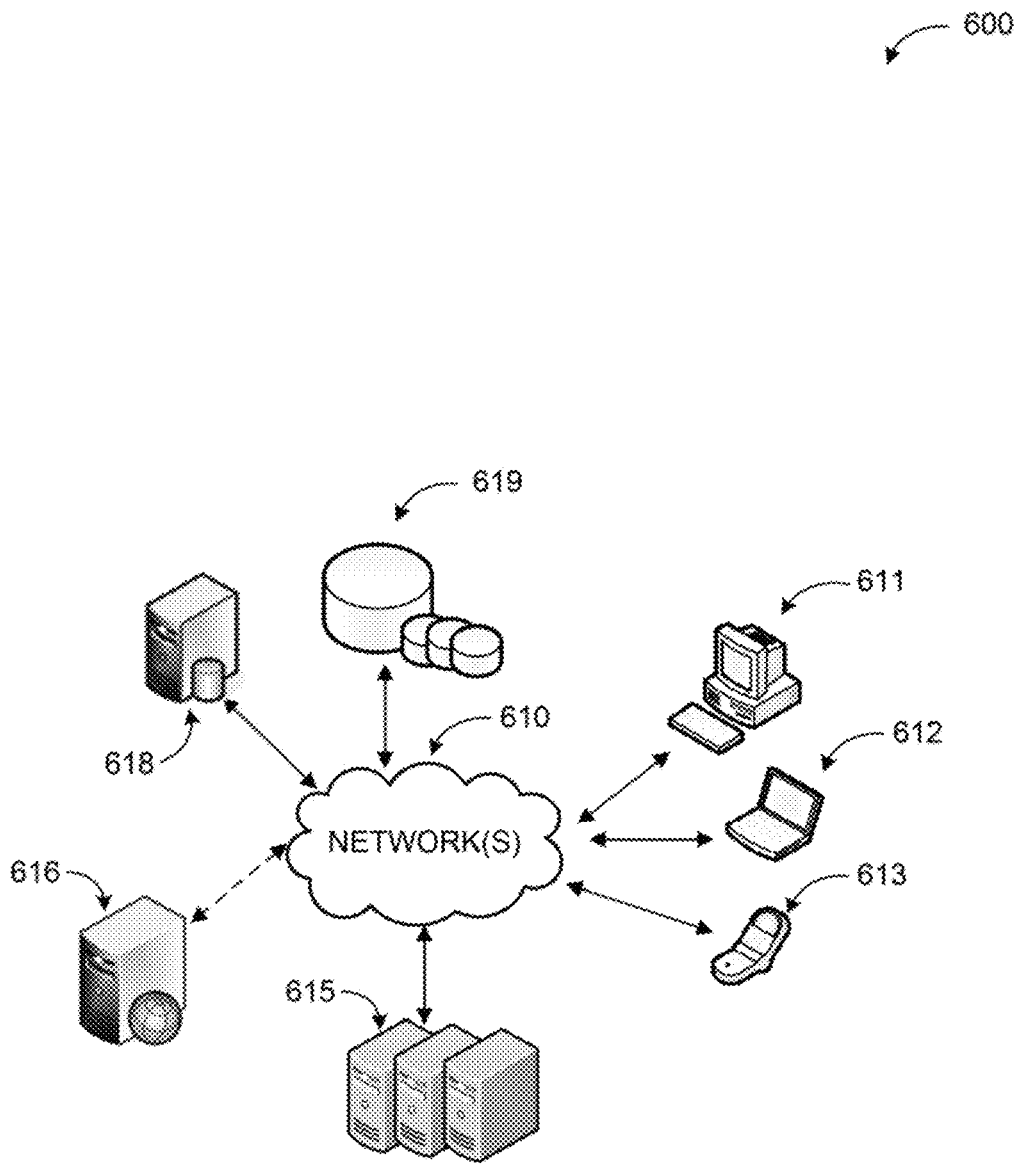
FIG. 6 is a simplified networked environment, where a system according to embodiments may be implemented.

FIG. 6 is a simplified networked environment, where a system according to embodiments may be implemented.

As shown in a diagram 600, a search service may be implemented in a networked environment over one or more networks, such as a network 610. Participants may access the search service through locally installed or thin (e.g., browser) client applications executed on a variety of computing devices 611-613, such as a smart phone 613, a mobile computer 612, or a desktop computer 611 ('client devices'). Data owners or third party services may provide configuration and selection input for presentation of their data in response to search queries. Search results may then be presented in tabular format based on the selections and configurations by the data owners or third parties.

A search service, as discussed herein, may be implemented via software executed over servers 615. The servers 615, may include one or more processing servers 616, where at least one of the one or more processing servers 616 may be configured to execute one or more applications associated with the search service. In other examples, the search service may be provided by a third party service or may include a web application. The search service may store data associated with searches in a data store 619 directly or through a database server 618.

In examples, the servers 615 may include the search service. The search service may include a data management engine and a search engine. The data management engine may be configured to receive a request from a party associated with the data to modify a presentation of a subset of the data and may present configuration options on a user experience to the requesting party. The configuration options may include a selection of the subset of the data and/or a selection of parameters associated with the presentation of the subset of the data. In response to receiving a selection of the configuration options, the data management engine may be further configured to format the selected subset of the data based on the received selection of the configuration options.

A computing device may communicate with the server over a network 610. The network 610 may comprise any topology of servers, clients, Internet service providers, and communication media. A system according to embodiments may have a static or dynamic topology. The network 610 may include multiple secure networks, such as an enterprise network, an unsecure network, or the Internet. The unsecure network may include a wireless open network. The network 610 may also coordinate communication over other networks, such as Public Switched Telephone Network (PSTN) or cellular networks. Furthermore, the network 610 may include multiple short-range wireless networks, such as Bluetooth, or similar ones. The network 610 may provide communication between the nodes described herein. By way of example, and not limitation, the network 610 may include wireless media. The wireless media may include, among others, acoustic media, RF media, infrared media, and other wireless media.

The search engine of the search service may be further configured to receive a search query associated with the data and may execute the search query on the subset of the data. In response, the search engine may be further configured to generate a preview table based on two-dimensionally ranked search results of the subset of the data in accordance with the selection of the one or more parameters to a computing device associated with a participant. The computing devices 611-613 may include a display device, such as a touch enabled display component, and a monitor, among others, to provide a client application to a participant. Local access to the client application may be provided by locally installed rich clients (e.g., a local version of the client application) or generic applications, such as a browser on the computing device 611-613.

A textual scheme, a graphical scheme, an audio scheme, an animation scheme, a coloring scheme, a highlighting scheme, and/or a shading scheme may be employed to distinguish the search results. Additionally, the schemes may be employed to distinguish attributes and information associated with the search results.

Many other configurations of computing devices, applications, data sources, and data distribution systems may be employed for providing a tabular presentation of data in a search environment. Furthermore, the networked environments discussed in FIG. 6 are for illustration purposes only. Embodiments are not limited to the example applications, modules, or processes.

Figure 7:
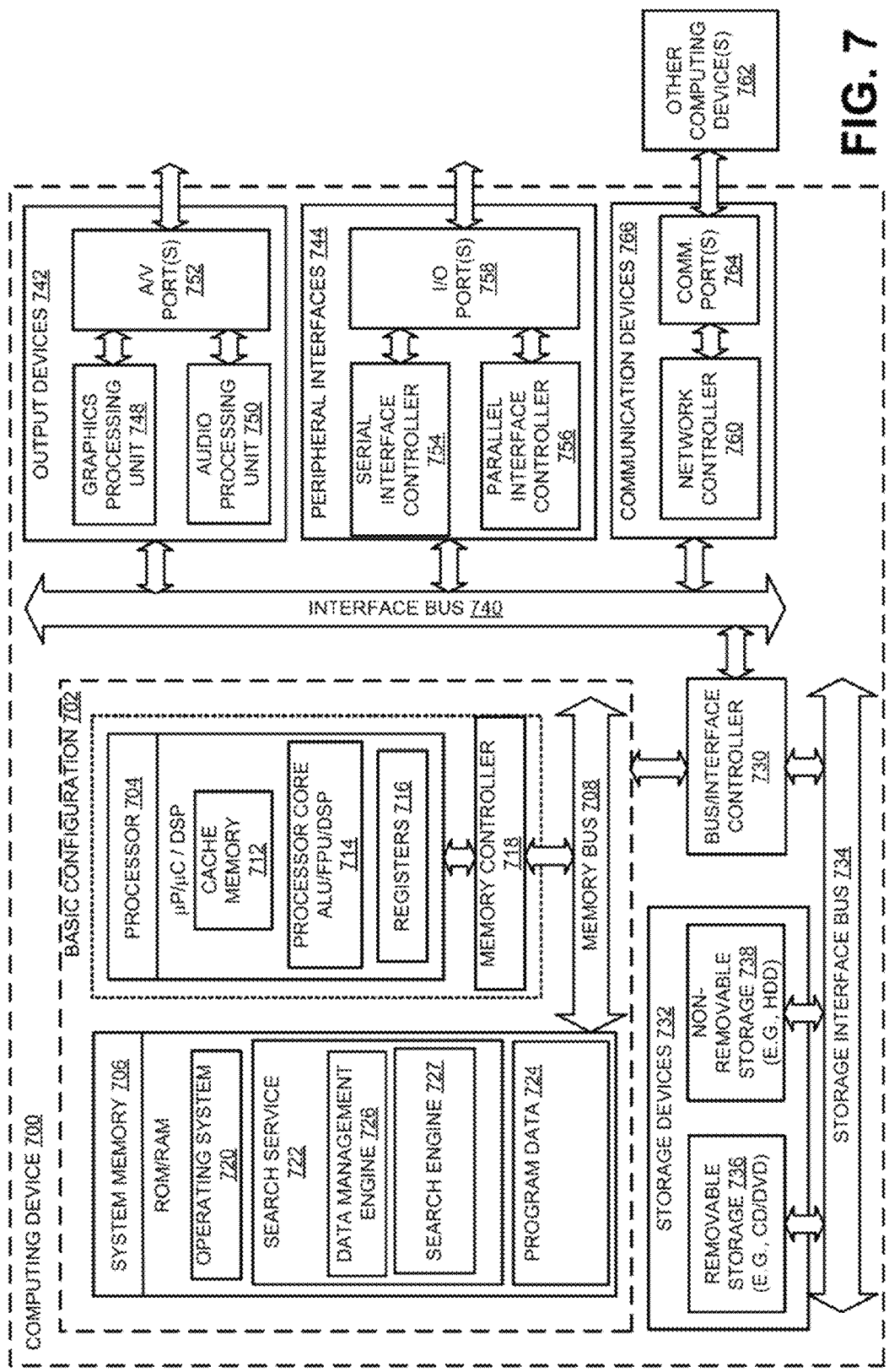
FIG. 7 is a block diagram of an example computing device, which may be used for providing a tabular presentation of data in a search environment, according to embodiments.

FIG. 7 is a block diagram of an example computing device, which may be used for providing a tabular presentation of data in a search environment, according to embodiments.

For example, a computing device 700 may be used as a server, desktop computer, portable computer, smart phone, special purpose computer, or similar device. In an example has configuration 702, the computing device 700 may include one or more processors 704 and a system memory 706. A memory bus 708 may be used for communication between the processor 704 and the system memory 706. The example basic configuration 702 may be illustrated in FIG. 5 by those components within the inner dashed line.

Depending on the desired configuration, the processor 704 may be of any type, including but not limited to a microprocessor (μP), a microcontroller (μC) a digital signal processor (DSP), or any combination thereof. The processor 704 may include one more levels of caching, such as a level cache memory 712, one or more processor cores 714, and registers 716. The one or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a search service 722, and a program data 624. The search service 722 may include a data management engine 726 and a search engine 727. The data management engine 726 may be configured to receive a request from a party associated with the data to modify a presentation of a subset of the data and present configuration options on a user experience to the requesting party. The configuration options may include a selection of the subset of the data and a selection of parameters associated with the presentation of the subset of the data. The data management engine 726 may also be configured to, in response to receiving a selection of the configuration options, format the selected subset of the data based on the received selection of the configuration options. The search engine 727 may be configured to receive a search query associated with the data execute the search query on the subset of the data, generate a preview table based on two-dimensionally ranked search results of the subset of the data in accordance with the selection of the parameters, and provide the preview table in response to the search query. The program data 724 may also include, among other data, search data, search result data, attribute data, and other information data related to the search results or the like, as described herein.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof.

Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 710. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for providing a tabular presentation of data in a search environment. These methods can be implemented in any number of ways, including the structures described herein. One such way ma be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that ma be machine automated.

Figure 8:
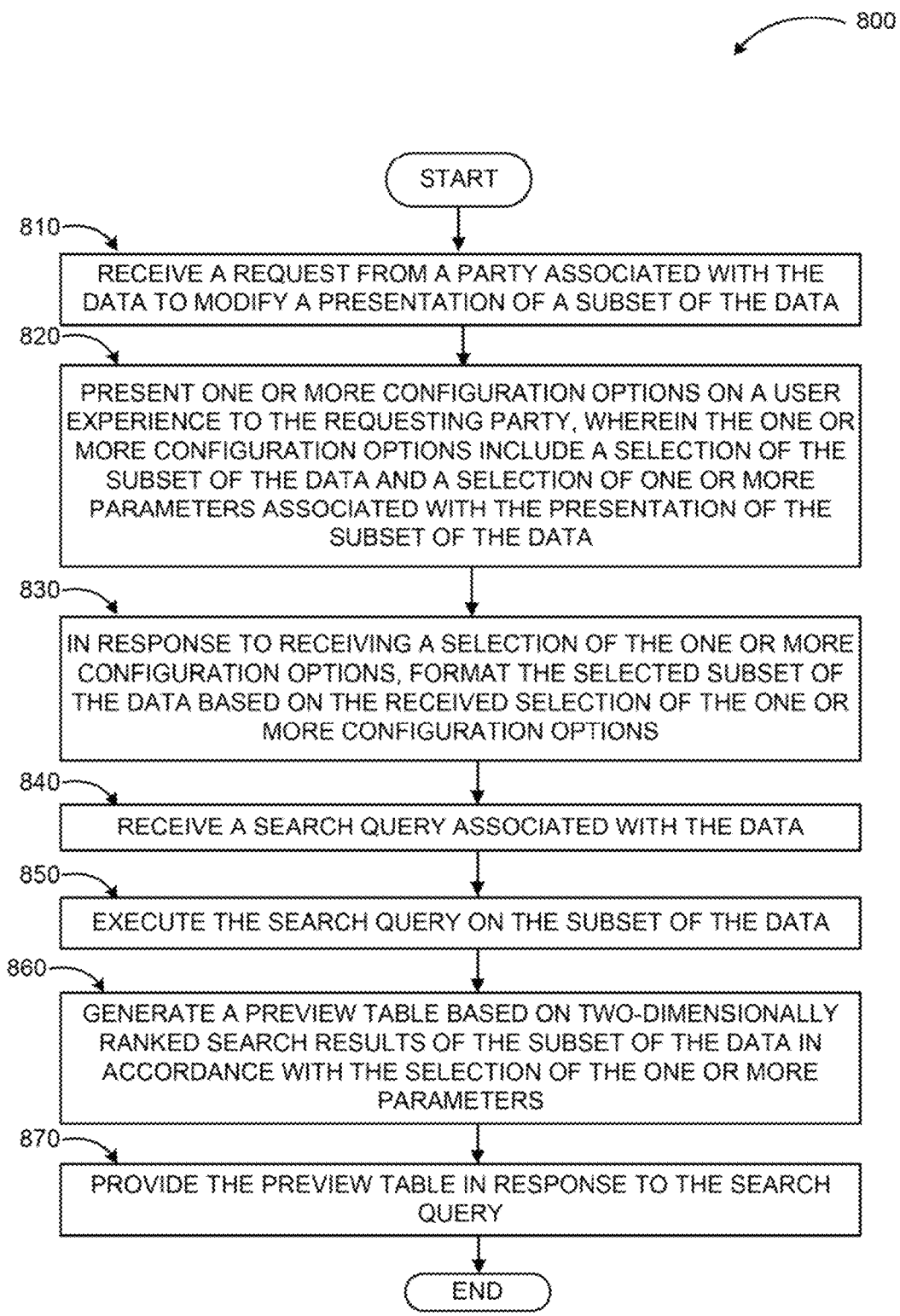
FIG. 8 is a logic flow diagram illustrating a process for providing a tabular presentation of data in a search environment, according to embodiments.

FIG. 8 is a logic flow diagram illustrating a process for providing a tabular presentation of data in a search environment, according, to embodiments.

A process 800 may be implemented on a server. As described, a server may include a search service that may generate a preview table in accordance with configuration options. The configuration options may be selected by a requesting party and may be associated with a subset of data. A participant may be allowed to interact with the preview table through a client application executed on the computing device 700.

The process 800 begins with operation 810, where the search service may receive a request from a party associated with the data to modify a presentation of a subset of the data. The requesting party may include a data owner or a third party, among other examples. The data may include big data, for example.

At operation 820, the search service may present configuration options on a user experience to the requesting party. The configuration options may include a selection of the subset of the data and/or a selection of one or more parameters associated with the presentation of the subset of the data, among others. The parameters associated with the presentation of the subset of the data may include a maximum number of returned search results, a minimum number of the returned search results, a name of a company associated with the data, personnel associated with the company, a location of the company, an identification associated with an employee of the company, a job title associated with the employee, to telephone number associated with the employee, an email address associated with the employee, a link to a professional networking site, a link to a social networking site, and/or metadata. (e.g. static or dynamic metadata), among others.

At operation 830, in response to receiving a selection of the configuration options, the search service may format the selected subset of the data based on the received selection of the configuration options. At operation 840, the search service ma receive a search query associated with the data. At operation 850, the search service may execute the search query on the subset of the data.

At operation 850, the search service may generate a preview table based on two-dimensionally ranked search results of the subset of the data in accordance with the selection of the one or more parameters.

At operation 870, the search service may provide the preview table in response to the search query. The search service may analyze a context of a keyword associated with the search query, analyze a context of a keyword associated with the one or more parameters, and compare the context of the keyword associated with the search query to the context of the keyword associated with the one or more parameters. In some examples, the search service may detect a first match percentage between the context of the keyword associated with the search query and the context of the keyword associated with the parameters. The search service may rank rows in the preview table in one of an ascending order and a descending order based on the first match percentage. In some examples, the search service may detect a second match percentage between the context of the keyword associated with the search query and the context of the keyword associated with the parameters. The search service may rank rows in the preview table in one of an ascending order and a descending order based on the second match percentage, wherein the first match percentage is greater than the second match percentage.

The operations included in process 800 are for illustration purposes. Providing a tabular presentation of data in a search environment may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a means for providing a tabular presentation of data in a search environment is provided. The means for providing the tabular presentation of the data in the search environment may include a means for receiving a request from a party associated with the data to modify a presentation of a subset of the data and a means for presenting configuration options on a user experience to the requesting party. The configuration options may include a selection of the subset of the data and a selection of parameters associated with the presentation of the subset of the data, in response to receiving a selection of the configuration options, the means for providing the tabular presentation of the data in the search environment may provide a means for formatting the selected subset of the data based on the received selection of the configuration options. The means may additionally include a means for receiving a search query associated with the data, a means for executing the search query on the subset of the data, a means for generating a preview table based on two-dimensionally ranked search results of the subset of the data in accordance with the selection of the parameters, and a means for providing the preview table in response to the search query.

According to other embodiments, an example server to provide a tabular presentation of data in a search environment is described. The example server may include a memory configured to store instructions and a processor coupled to the memory. The processor may be configured to execute a search service. The search service may include a data management engine. The data management engine may be configured to receive a request from a party associated with the data to modify a presentation of a subset of the data and may present configuration options on a user experience to the requesting party. The configuration options may include a selection of the subset of the data and a selection of parameters associated with the presentation of the subset of the data. In response to receiving a selection of the configuration options, the data management engine may format the selected subset of the data based on the received selection of the configuration options. The search service may also include a search engine. The search engine may be configured to receive a search query associated with the data, execute the search query on the subset of the data, generate a preview table based on two dimensionally ranked search results of the subset of the data in accordance with the selection of the parameters, and provide the preview table in response to the search query.

According to other examples, the search engine may be further configured to implement an intelligent learning algorithm to identify a previous search query associated with the data. The previous search query may share a keyword, a syntax modifier, and/or a portion of the keyword with the search query. The search engine may also execute the previous search query on the subset of the data. In other examples, the search engine may also modify the preview table based on two-dimensionally ranked previous search results of the subset of the data. The search engine may additionally rank the search results of the subset of the data based on the ranking of the previous search results of the subset of the data and may model the preview table based on the generation of the modified preview table.

According to further examples, the preview table may be generated by a process to compare the search query to the parameters associated with the presentation of the subset of the data and may detect a match between the search query and the parameters associated with the presentation of the subset of the data. The process may further map the parameters to column headers of the preview table, execute the search query on the subset of the data, and may populate the preview table with the search results. The parameters associated with the presentation of the subset of the data may include a maximum number of returned search results, a minimum lumber of the returned search results, a name of a company associated with the data, personnel associated with the company, a location of the company, an identification associated with an employee of the company, a job title associated with the employee, a telephone number associated with the employee, an email address associated with the employee, and/or metadata, among other examples.

According to yet other examples, the data management engine may be further configured to in response to selecting the configuration options, modify a confidentiality associated with the selected subset of the data based on the received selection of the configuration options. The data management engine may also receive another selection of the configuration options that includes another selection of the parameters associated with the presentation of the subset of the data. The other selection of the parameters may include a link to a professional networking site and a link to as social networking site. The data management engine may re-format the selected subset of the data based on the other selection of the configuration options.

According to yet further examples, the search engine may be further configured to receive another search query associated with the data and may execute the other search query on the subset of the data. The search engine may modify the preview table based on two-dimensionally ranked search results of the subset of the data in accordance with the other selection of the parameters and may provide the modified preview table in response to the search query. The search engine may also receive an action executed on one of the search results on the modified preview table. The action may include an input action and/or a hover action, among others. The search engine may also execute the action to open the link to the professional networking site or execute the action to open the link to the social networking site. The search engine may further employ a textual scheme, a graphical scheme, an audio scheme, an animation scheme, a coloring scheme, a highlighting scheme, and/or a shading scheme to distinguish the search results of the subset of the data in the preview table.

According to other examples, an example method for providing a tabular presentation of data in a search environment is described. The example method may include receiving a request from a party associated with the data to modify a presentation of a subset of the data and presenting configuration options on a user experience to the requesting party. The configuration options may include a selection of the subset of the data and/or a selection of parameters associated with the presentation of the subset of the data. The requesting party may include a data owner or a third party. In response to receiving a selection of the configuration options, the example method may further include formatting the selected subset of the data based on the received selection of the configuration options. The example method may also include receiving a search query associated with the data, executing the search query on the subset of the data, generating a preview table based on two-dimensionally ranked search results of the subset of the data in accordance with the selection of the parameters, and providing the preview table in response to the search query.

According to some examples, the method may further include analyzing a context of a keyword associated with the search query, analyzing a context of a keyword associated with the parameters, and comparing the context of the keyword associated with the search query to the context of the keyword associated with the parameters. The method may also include detecting a first match percentage between the context of the keyword associated with the search query and the context of the keyword associated with the parameters. The method may further include ranking rows in the preview table in one of an ascending order and a descending order based on the first match percentage.

According to yet other examples, the method may include detecting a second match percentage between the context of the keyword associated with the search query and the context of the keyword associated with the parameters. The method may further include ranking rows in the preview table in one of an ascending order and a descending order based on the second match percentage. The first match percentage is greater than the second match percentage.

According to some other examples, the method may also include detecting a credential associated with the requesting party from the data and comparing the credential to a predefined rule. The method may include detecting a match between the credential and the predefined rule. The method may further include identifying the requesting party as an administrator, contacting the requesting party to prompt the requesting party to modify the configuration options on the user experience, receiving a selection of the configuration options from the requesting party, and re-formatting the selected subset of the data based on the received selection of the configuration options.

According to further examples, an example computer-readable memory device with instructions stored thereon for providing a tabular presentation of data in a search environment is described. The instructions may include receiving a request from a party associated with the data to modify a presentation of a subset of the data. The party associated with the data includes one of a data owner and a third party. The instructions may also include presenting configuration options on a user experience to the requesting party. The configuration options may include a selection of the subset of the data and/or a selection of parameters associated with the presentation of the subset of the data. In response to receiving a selection of the configuration options, the instructions may further include formatting the selected subset of the data based on the received selection of the configuration options. The instructions may further include receiving a search query associated with the data, executing the search query on the subset of the data, generating a preview table based on two-dimensionally ranked search results of the subset of the data in accordance with the selection of the parameters, and providing, the preview table in response to the search query.

According to other examples, the instructions may further include implementing an intelligent learning algorithm to identify a previous search query associated with the data. The previous search query shares a keyword, a syntax modifier, and/or a portion of the keyword with the search query. The instructions may also include executing the previous search query on the subset of the data, modifying the preview table based on two-dimensionally ranked previous search results of the subset of the data, ranking the search results of the subset of the data based on the ranking of the previous search results of the subset of the data, and modeling the preview table based on the generation of the modified preview table.

According to yet further examples, the instructions may also include analyzing a context of a keyword associated with the search query and analyzing a context of a keyword associated with a select parameter of the parameters. The parameters are associated with the presentation of the subset of the data. The instructions may further include comparing the context of the keyword associated with the search query to the context of the keyword associated with the select parameter. In response to detecting a first match percentage between the context of the keyword associated with the search query to the context of the keyword associated with the select parameter, the instructions may further include ranking rows in the preview table in one of an ascending order and a descending order based on the first match percentage. In response to detecting a second match percentage between the context of the keyword associated with the search query to the context of the keyword associated with the select parameter, the instructions may further include ranking rows in the preview table in one of an ascending order and a descending order based on the second match percentage. The first match percentage is greater than the second match percentage.

The above specification, examples and data provide a complete description of the manufacture and use of the composition of the embodiments. Although the subject matter has been described, in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server configured to provide a tabular presentation of data in a search environment, the server comprising:
   a memory configured to store instructions;
   a processor coupled to the memory, the processor configured to execute a search service, wherein the processor is configured to:
      receive a request from a requesting party device to modify a presentation of a subset of the data, wherein a requesting party initiates the request from the requesting party device, the requesting party being a data owner of the data;
      present one or more configuration options with a user interface to the requesting party device, wherein the one or more configuration options include a selection of the subset of the data and a selection of one or more parameters associated with the presentation of the subset of the data;

in response to receiving a selection of the one or more configuration options, format the selected subset of the data based on the received selection of the one or more configuration options;

receive, after receiving the selection of the one or more configuration options, a search query associated with the data from a search device;

execute the search query on the subset of the data;

generate a preview table based on two-dimensionally ranked search results of the subset of the data in accordance with the selection of the one or more parameters; and provide the preview table to the search device in response to the search query.

2. The server of claim 1, wherein the search engine is further configured to:

implement an intelligent learning algorithm to:
identify a previous search query associated with the data, wherein the previous search query shares one or more of a keyword, a syntax modifier, and a portion of the keyword with the search query; and
execute the previous search query on the subset of the data.

3. The server of claim 2, wherein the search engine is further configured to:

modify the preview table based on two-dimensionally ranked previous search results of the subset of the data;
rank the search results of the subset of the data based on the ranking, of the previous search results of the subset of the data; and
model the preview table based on the generation of the modified preview table.

4. The server of claim 1, wherein the preview table is generated by a process to:

compare the search query to the one or more parameters associated with the presentation of the subset of the data; and
detect a match between the search query and the one or more parameters associated with the presentation of the subset of the data.

5. The server of claim 4, wherein the preview table is generated by a process to:

map the one or more parameters to column headers of the preview table;
execute the search query on the subset of the data; and
populate the preview table with the search results.

6. The server of claim 1, wherein the one or more parameters associated with the presentation of the subset of the data include a maximum number of returned search results, a minimum number of the returned search results, a name of a company associated with the data, personnel associated with the company, a location of the company, an identification associated with an employee of the company, a job title associated with the employee, a telephone number associated with the employee, an email address associated with the employee, and metadata.

7. The server of claim 1, wherein the data management engine is further configured to:

in response to selecting the one or more configuration options, modify a confidentiality associated with the selected subset of the data based on the received selection of the one or more configuration options.

8. The server of claim 1, wherein the data management engine is further configured to:

receive another selection of the one or more configuration options that includes another selection of the one or more parameters associated with the presentation of the subset of the data, wherein the other selection of the one or more parameters includes a link to a professional networking site and a link to a social networking site; and re-format the selected subset of the data based on the other selection of the one or more configuration options.

9. The server of claim 8, wherein the search engine is further configured to:

receive another search query associated with the data;
execute the other search query on the subset of the data;
modify the preview table based on two-dimensionally ranked search results of the subset of the data in accordance with the other selection of the one or more parameters; and
provide the modified preview table in response to the search query.

10. The server of claim 9, wherein the search engine is further configured to:

receive an action executed on one of the search results on the modified preview table, wherein the action includes one of an input action and a hover action; and
one of:
execute the action to open the link to the professional networking site; or
execute the action to open the link to the social networking site.

11. The server of claim 1, wherein the search engine is further configured to:

employ one or more of a textual scheme, a graphical scheme, an audio scheme, an animation scheme, a coloring scheme, a highlighting scheme, and a shading scheme to distinguish the search results of the subset of the data in the preview table.

12. A method for providing a tabular presentation of data in a search environment, the method comprising:

receiving a request from a requesting party device to modify a presentation of a subset of the data, wherein a requesting party initiates the request from the requesting party device;

presenting one or more configuration options with a user interface to the requesting party device,
wherein the one or more configuration options include a selection of the subset of the data and a selection of one or more parameters associated with the presentation of the subset of the data, and
wherein the requesting party includes one of a data owner and a third party;

in response to receiving a selection of the one or more configuration options, formatting the selected subset of the data based on the received selection of the one or more configuration options;

receiving, after receiving the selection of the one or more configuration options, a search query associated with the data from a search device;

executing the search query on the subset of the data;

generating a preview table based on two-dimensionally ranked search results of the subset of the data in accordance with the selection of the one or more parameters; and providing the preview table to the search device in response to the search query.

13. The method of claim 12, further comprising:

analyzing a context of a keyword associated with the search query;

analyzing a context of a keyword associated with the one or more parameters; and comparing the context of the keyword associated with the search query to the context of the keyword associated with the one or more parameters.

14. The method of claim 13, further comprising:

detecting a first match percentage between the context of the keyword associated with the search query and the context of the keyword associated with the one or more parameters; and ranking rows in the preview table in one of an ascending order and a descending order based on the first match percentage.

15. The method of claim 14, further comprising:

detecting a second match percentage between the context of the keyword associated with the search query and the context of the keyword associated with the one or more parameters; and ranking rows in the preview table in one of an ascending order and a descending order based on the second match percentage, wherein the first match percentage is greater than the second match percentage.

16. The method of claim 12, further comprising:

detecting a credential associated with the requesting party from the data;

comparing the credential to a predefined rule; and detecting a match between the credential and the predefined rule.

17. The method of claim 16, further comprising:

identifying the requesting party as an administrator;

contacting the requesting party to prompt the requesting party to modify one or more configuration options on the user experience;

receiving a selection of the one or more configuration options from the requesting party; and re-formatting the selected subset of the data based on the received selection of the one or more configuration options.

18. A computer-readable memory device with instructions stored thereon for providing a tabular presentation of data in a search environment, the instructions comprising:

receiving a request from a requesting party device to modify a presentation of a subset of the data, wherein a requesting party initiates the request from the requesting party device, wherein the party associated with the data includes one of a data owner and a third party;

presenting one or more configuration options with a user interface to the requesting party device, wherein the one or more configuration options include a selection of the subset of the data and a selection of one or more parameters associated with the presentation of the subset of the data;

in response to receiving a selection of the one or more configuration options, formatting the selected subset of the data based on the received selection of the one or more configuration options;

receiving, after receiving the selection of the one or more configuration options, a search query associated with the data from a search device;

executing the search query on the subset of the data;

generating a preview table based on two-dimensionally ranked search results of the subset of the data in accordance with the selection of the one or more parameters; and providing the preview table to the search device in response to the search query.

19. The computer-readable memory device of claim 18, wherein the instructions further comprise:

implementing an intelligent learning algorithm to:

identify a previous search query associated with the data, wherein the previous search query shares one or more of a keyword, a syntax modifier, and a portion of the keyword with the search query;

execute the previous search query on the subset of the data;

modify the preview table based on two-dimensionally ranked previous search results of the subset of the data;

rank the search results of the subset of the data based on the ranking of the previous search results of the subset of the data; and model the preview table based on the generation of the modified preview table.

20. The computer-readable memory device of claim 18, wherein the instructions further comprise:

analyzing a context of a keyword associated with the search query;

analyzing a context of a keyword associated with a select parameter of the one or more parameters, the one or more parameters being associated with the presentation of the subset of the data;

comparing the context of the keyword associated with the search query to the context of the keyword associated with the select parameter;

in response to detecting a first match percentage between the context of the keyword associated with the search query to the context of the keyword associated with the select parameter, ranking rows in the preview table in one of an ascending order and a descending order based on the first match percentage; and in response to detecting a second match percentage between the context of the keyword associated with the search query to the context of the keyword associated with the select parameter, ranking rows in the preview table in one of an ascending order and a descending order based on the second match percentage, wherein the first match percentage is greater than the second match percentage.

* * * * *